United States Patent
Bergner et al.

(10) Patent No.: US 9,761,006 B2
(45) Date of Patent: Sep. 12, 2017

(54) METHODS OF UTILIZING IMAGE NOISE INFORMATION

(71) Applicant: KONINKLIJKE PHILIPS N.V., Eindhoven (NL)

(72) Inventors: Frank Bergner, Hamburg (DE); Rolf Dieter Bippus, Hamburg (DE); Bernhard Johannes Brendel, Norderstedt (DE); Michael Grass, Buchholz in der Nordheide (DE); Cristian Lorenz, Hamburg (DE); Thomas Koehler, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/896,827

(22) PCT Filed: Jun. 26, 2014

(86) PCT No.: PCT/EP2014/063589
§ 371 (c)(1),
(2) Date: Dec. 8, 2015

(87) PCT Pub. No.: WO2014/207139
PCT Pub. Date: Dec. 31, 2014

(65) Prior Publication Data
US 2016/0140725 A1    May 19, 2016

(30) Foreign Application Priority Data
Jun. 28, 2013    (EP) .................................... 13174196

(51) Int. Cl.
*G06T 7/00*    (2017.01)
*G06T 5/00*    (2006.01)
(Continued)

(52) U.S. Cl.
CPC ............ *G06T 7/0089* (2013.01); *G06T 5/002* (2013.01); *G06T 7/12* (2017.01); *G06T 7/13* (2017.01);
(Continued)

(58) Field of Classification Search
CPC .................. G06T 5/002; G06T 7/0085; G06T 2207/20124; G06T 2207/20148;
(Continued)

(56) References Cited

U.S. PATENT DOCUMENTS

| | | | |
|---|---|---|---|
| 6,169,817 B1 * | 1/2001 | Parker | G06T 7/0012 345/419 |
| 8,824,753 B2 * | 9/2014 | Souza | G06T 5/002 382/128 |
| 2008/0205716 A1 * | 8/2008 | Von Berg | G06T 7/0083 382/128 |

OTHER PUBLICATIONS

Lecellier, "Region-Based Active Contour with Noise and Shape Priors", Image Processing, 2006 IEEE International Conference on, IEEE, PI, Oct. 1, 2006, pp. 1649-1652.
(Continued)

*Primary Examiner* — Yon Couso

(57) ABSTRACT

Image processing methods and related apparatuses (SEG, UV). The apparatuses (SEG,UV) operate to utilize noise signal information in images (IM). According to one aspect, apparatus (SEG) uses the noise information (FX) to control a model based segmentation. According to a further aspect, apparatus (UV) operates, based on the noise information (FX), to visualize the uncertainty of image information that resides at edge portions of the or an image (IM).

14 Claims, 8 Drawing Sheets

(51) Int. Cl.
G06T 7/12 (2017.01)
G06T 7/13 (2017.01)
G06T 7/149 (2017.01)
G06T 7/136 (2017.01)

(52) U.S. Cl.
CPC .............. *G06T 7/136* (2017.01); *G06T 7/149* (2017.01); *G06T 2207/10072* (2013.01); *G06T 2207/20076* (2013.01); *G06T 2207/20116* (2013.01); *G06T 2207/20124* (2013.01); *G06T 2207/30004* (2013.01)

(58) Field of Classification Search
CPC ......... G06T 2207/30004; G06T 7/0089; G06T 2207/10072; G06T 2207/20076; G06T 2207/20116; G06T 7/0083; G06T 7/12; G06T 7/13; G06T 7/149; G06T 7/136
USPC ........................................................ 382/173
See application file for complete search history.

(56) References Cited

OTHER PUBLICATIONS

Slabaugh G et al: "Ultrasound-Specific Segmentation via Decorrelation and Statistical Region-Based Active contours", Conference on Computer Vision and Pattern Recognition, 2006 IEEE Computer Society, New York, NY, USA Jun. 17-22, 2006, IEEE, vol. 1, Jun. 17, 2006, pp. 45-53.

Ayed, "Multiregion Level-Set Partitioning of Synthetic Aperture Radar Images", Transactions on Pattern Analysis and Machine Intelligence, IEEE, vol. 27, No. 5, May 1, 2005.

Chesnaud, "Statistical region Snake-Based Segmentation Adapted to Difference Physical Noise Models", IEEE Transactions on Pattern Analysis and Machine Intelligence, IEEE Computer Society, vol. 21, No. 11, Nov. 1, 1999.

Lecellier, "Statistical Region-Based Active Contours with Exponential Family Observations", Acoustics, Speech and Signal Processing 2006. ICASSP 2006 Proceedings, 2006 IEEE International Conference on Toulouse, France May 14-19, 2006, May 14, 2006 p. 11.

Goudail, "Influence of the Noise Model on Level Set Active Contour Segmentation" IEEE Transactions on Pattern Analysis and Machine Intelligence, IEEE Computer Society, vol. 26, No. 6, Jun. 1, 2004.

Xu, "Electronic Noise Modeling in Statistical Iterative Reconstruction", IEEE Transactions on Image Processing, vol. 18, No. 6, Jun. 2009.

Lundström, "Uncertainty Visualization in Medical Volume Rendering Using Probabilistic Animation" IEEE Transactions on Visualization and Computer Graphics, vol. 16, No. 6, Nov. 2007.

Xie, Image Segmentation based on maximum-liklihood estimation and optimum entrophy-distribution (MLE-OED), Apr. 28, 2003.

Fessler, "Maximum-liklihood dual-energy tomographic image reconstruction", SPIE 2002 Medical Imaging, 4684-05.

Praβni, "Uncertainty-Aware Guided Volume Segmentation", Oct. 24, 2010.

Piramuthu, "Penalized Maximum Liklihood Image Reconstruction with Min-Max Incorporation of Noisy Side Information", 1998 IEEE.

Allerstorfer, Uncertainty Visualization of Computed Tomography Datasets from Complex Components Using Statistical Analysis, 2010.

Meer, "Edge Detection with Embedded Confidence", IEEE Transactions on Pattern Analysis and Machine Intelligence, vol. 23, No. 12, Dec. 2001.

T. Koehler et al., "Correction of Breathing Motion in the Thorax for Helical CT", Tsinghua Science & Technology, 15(1), 87-95, 2010.

T. Koehler "Noise Properties of Maximum Likelihood Reconstruction with Edge-Preserving Regularization in Transmission Tomography", Proceedings of the Fully 3D, 263-266, 2009.

* cited by examiner

METHODS OF UTILIZING IMAGE NOISE INFORMATION

CROSS REFERENCE TO RELATED APPLICATIONS

This application is a national filing of PCT application Ser. No. PCT/ EP2014/063589,filed Jun. 26, 2014, published as WO 2014/207139 on Dec. 31, 2014, which claims the benefit of European Patent Application Number 13174196.9 filed Jun. 28, 2013, which is incorporated herein by reference.

FIELD OF THE INVENTION

The present invention relates to methods for image processing, to image processing apparatuses, to a computer program element, and to a computer readable medium.

BACKGROUND OF THE INVENTION

In certain fields of endeavors such as the medical fields, but also others such as geology or nondestructive material testing, there is a reliance on image data. For instance, in medical imaging, such as CT (computed tomography), X-ray projection data (measured by a detector of an imager apparatus) are reconstructed to "image slices" of a volume by a reconstruction algorithm. Such slice images can be used to show, when displayed, the internal anatomy of a patient in a grayscale visualization. In this case, the image information is in the form of (in generally) different attenuation values that the X-ray experienced in its passage through the patient's body. Unfortunately there is oftentimes uncertainty in said image information caused by prevalent noise signals. These noise signals may stem from the measurement process at the detector or may stem from the reconstruction algorithm itself. Previously, the prevalence of noise has been mainly thought of as a nuisance that needs to be eliminated or has been ignored altogether.

SUMMARY OF THE INVENTION

There may therefore be a need for methods and related apparatuses that are based on different approach in respect of image noise.

The object of the present invention is solved by the subject matter of the independent claims where further embodiments are incorporated in the dependent claims. It should be noted that the following described aspect of the invention equally apply to the image processing apparatuses, to the computer program element and to the computer readable medium.

According to a first aspect of the invention there is provided a method for image processing, comprising the following steps of:

receiving an image and a specification of a spatially varying distribution of a noise signal level across different locations in the image;

segmenting the image for a model, wherein the segmentation step includes iteratively adapting the model to different image locations to obtain a plurality of differently adapted models, wherein the model adaptation is controlled by the noise signal level at the different image locations;

outputting one of the differently adapted models, the output model outlining a segmentation of the image.

A main area of application of the proposed method is in model-based segmentation. However, unlike previous segmentation methods, it is proposed herein to not only use a predefined model as an input for the segmentation, but also the specification of the noise distribution levels across the image to be segmented. The specification can take any suitable form such as local variances or probability distributions. The method is applicable to any image but it has been observed that the method is of particular benefit with images in which the noise distribution has a relatively pronounced spatial variation across the image. For instance, it has been observed that in images produced with certain iterative image reconstruction methods, the noise level appears to be concentrated around edge portions (that is at the interface between high and low contrast image portions, also known as plateaus). Such a behavior has been observed for instance for the maximum likelihood reconstruction method (MLIR) that uses Poisson distributions to model detector behavior and a-priori models like Markov random field for the distribution of image values. The method essentially harnesses this knowledge that noise tends to concentrate around image structures, to guide or control the adaptation of the model to the image information. Segmentation is along the edges but there is a tendency to avoid the highly noise edges themselves. The proposed method is iterative in nature, in that it repeatedly adapts the model to different locations in the image. The specification itself of the noise distribution can take any form, for instance a parameterized family of local (that is, attached to each image point or at least image portions) probability distributions or noise maps. In a noise map, each point records the local variance at the respective point in the image.

Putting the knowledge about the noise (level) distribution in the image into practice may take many forms. For instance, according to one embodiment, the controlling of the iterative model adaptation includes deflecting a model point towards said different image locations, wherein a strength of the respective deflection action varies inversely (but not necessarily in the strict mathematical sense) with the local noise signal level at the different locations. The model itself may be given as a mesh whose vertices positions can be independently changed. A change in position, that is, a deflection, of one or more of model (mesh) points from an original ideal shape (as embodied by the model in its undeflected (unperturbed) state) would then constitute in this embodiment an instance of an adaptation of the model. The strength of the deflection action is essentially measured by the distance (specifiable in pixels or voxels or other suitable image elements such as "blobs" of which the image is formed) by which a given model point needs to be displaced in order to arrive at a given image point. In other words, as envisaged herein, the amount of deflection or displacement for a given model point is also controlled by the amount of noise at the image point to which the model point is to be displaced to.

For instance, according to one embodiment, the variation of the deflection strength is achieved by applying a noise level dependent weight to a term of an objective function to drive an optimization process for the segmentation step. Said term is envisaged to measure an attraction level of the model point to the different locations. In one embodiment, the deflection strength varies essentially inversely (not necessarily in the strict mathematical sense) with the amount of noise at the image point to which the model point is to be deflected to. In yet other words, the higher the noise level at the image point, the higher the cost that will be associated in the optimization process with the deflection that need to be applied to the respective model point. The spatial (that is, across the image) variance of the noise dependent weights act to penalize model adaptations towards image locations with higher noise signal level than at other image locations.

The weights can also be combined in one embodiment with further weights that act to penalize non-smooth adaptations or those that would violate predefined restrictions that are imposed by an assumed, artificial "elasticity" of the model. A non-smoothness measure can be for instance the surface integral over the absolute changes in the displacement vectors along the assumed model surfaces.

In some embodiments, the control function of the noise level is multiplicative in that the weight (essentially a number) greater than one would incur a higher cost for the respective displacement, then weight less than one which would incur less cost for the respective displacement. However this is merely one embodiment a control function that acts in an additive manner is also envisaged herein.

For instance according to one embodiment, the segmentation step includes computing an objective (or cost) function (that represents the cost) to drive an optimization process for the segmentation step. The optimization process includes iterating through the different locations. The objective function comprises a plurality of terms each representing a different objective. One of the terms in this embodiment then represents the noise signal level at each of the different image locations, wherein said noise term acts to penalize at locations with higher noise signal level. In particular, the "noise term" acts to penalize non-smooth model adaptations at locations with higher noise signal level.

The proposed model based segmentation method may also be put to use in dual energy imagery. In this embodiment, dual-energy image comprises two images, one for each energy channel, and the noise level specification includes a separate noise level specification for each energy channel. The steps of the method are applied separately for each of the two energy channel images.

In sum, although noise signals are widely considered a nuisance which best avoided or ignored, Applicants have discovered that the presence of noise can actually be used with benefit to guide or control the course of the optimization process in a model based segmentation. To this end, spatially varying noise dependent weights are proposed herein for the cost (sometime called the "external energy") associated with an adaptation of an initial model to image locations or features. Said benefit comes to bear in particular with types of images (such as MLIR reconstructions) where the noise signals tend to concentrate around image features of interest, such as edges.

According to a second aspect there is provided a further method of image processing, comprising:

receiving i) an initial image, at least part of the image information encoding at least two different plateaus, high and low, that define an edge region between said high and low plateaus, and ii) a specification of a spatially varying distribution of noise across the image;

for an edge region point carrying an edge region point value and based on the noise specification as applicable to said point, evaluating an uncertainty at said point with respect to a confidence threshold;

in dependence on said local noise evaluation, generating a high (HI)- or low (LW)-image from the initial image by either shifting the edge region point's value towards the higher plateau to so obtain the high-image, or by shifting the edge point value towards the lower plateau to so obtain the low-image;

displaying the high- or low image instead of or alongside with the image to so furnish information on the uncertainty as to the course (that is where the edge "runs" or extent or shape of the edge) of the edge, the uncertainty at least partly caused by the noise.

Edge/edge regions are essentially (but not only) image points/elements (such as pixels, voxels, or other) situated at or around the interface of the two plateaus. In one embodiment, the edge points can be defined by having the image processed by an edge detector (Sobel, Canny or others). Edges points are then those that cause the edge detector to return a sufficiently strong response which will depend on the image, the edge detector and its settings. Image plateaus are image portions enclosed by the detected edges. This may mean that values of image points within the plateaus will exhibit in general relatively little variance compared to edges.

The, in general, user defined confidence level is a number that measures and hence varies with the reliability of the edge points in the image. The confidence level aims at quantifying the possibility of a given edge point to be a high plateau point or a low plateau point. The confidence level may be a probability or it may be any positive number. In one embodiment, the confidence level is a multiple (or scaling) of the local variance at said edge point. How exactly the uncertainty evaluation is done will in general depend on the form of the noise level specification and the definition of the confidence level. Also, the definition of the confidence level (that is what exactly the confidence indicates) is in general a function of how (that is, in which form) the local noise level is specified. For instance, in one embodiment and similar to what has been said earlier in relation of the first aspect, noise levels are specified by a "noise map", that is, by local variances of point values. Evaluation is then by comparing neighboring high and low plateau points against the variance at the respective edge points. In another embodiment, the noise level is specified by a family of local probability distributions of the point values. In this embodiment, evaluation is by computing the probabilities (set as the confidence level) of the edge point being higher and/or lower than a given high plateau point or a low plateau point, respectively.

The evaluation of the uncertainty is by combining the confidence level with the noise level specification to arrive at a criterion on whether or not to change the edge point value and if yes, whether to up and/or downshift said value into a high plateau point (that is, a point from the high plateau) or into a low plateau point (that is, a point from the low plateau). If the local evaluation of the uncertainty information is inclusive, the original value of the edge point is retained. If there is a need to up and down shift the edge point value, because the uncertainty information indicates that the edge point could be both, a high plateau point and a low plateau point, then both, the high and low image, are generated. In some embodiments, shifting down or up means, that the edge point's value is changed to assume the value of the neighboring low or high plateau point or to assume an average value of the respective plateau. However in other embodiments, the edge point value is changed by a fraction of the difference between the current edge point value and the high or low point. If there is more than one plateaus neighboring the edge point, the uncertainty is evaluated for each and the edge point is then changed into the respectively lowest or highest plateau point.

In one embodiment, the method is iteratively applied to the high and or low images. In other words in the low image, the neighboring points of the (previously) changed edge points are evaluated in a completely analogous manner. A downshift is then applied in the low image whereas an upshift is applied to the corresponding point in the high image. The neighboring points of the (previously) changed edge points in the high image are similarly evaluated. In this manner two sequences are generated during the course of the iteration: a sequence of high images and a sequence of low images. The iterations will converge gradually when moving away from the edge region and into the respective plateaus.

In one embodiment, the displaying operation includes operating a graphical user interface generator to control a display unit to render for display on a display unit an interactive graphical user interface (GUI) that includes the high- and/or low image instead of or alongside with the image.

According to one embodiment, the method comprises toggling between the high- and low-image so as to display, in turn, the high- and low-images. Preferably the toggling is executed repeatedly to so better visualize to the human user the apparent motion or change of the edge region and, equivalently, of the plateaus, caused by the down/up shift of the pixel values. The amount of change or the extent of the motion serves as a convenient and intuitive visual clue for the user to gauge the uncertainty that resides in and around the edge (region) with more change or more extensive motion indicative of higher uncertainty. The toggling is in one embodiment responsive to a user request issued via interaction with the GUI. Toggling between any either one of the high and low images and the (initial) image is also envisaged herein. In one embodiment, the toggling modes are adjustable by suitable interaction via the GUI.

According to one embodiment, the method comprises cycling through the high-image, low-image, and the image in a user-defined order. Again, the cycling operation is in response to a user input supplied preferably (but in no way limiting) via the GUI. The cycling sequence is adjustable.

According to one embodiment, the method comprises displaying a difference image formed from any one of i) the high-image and the image and/or ii) the low-image and image. This allows an easy visual grasp of the changes in shape and/or size of the edge portion and/or of the two plateaus.

According to one embodiment, the method comprises displaying a mean course for the edge alongside with either one or both of the high- and low-image, the mean course computed from the mean of the probability distribution at the edge points forming the edge.

As will be appreciated from the above, both methods essentially utilize noise signals in an image for image processing, in particular, for segmentation or edge uncertainty visualization. The two methods can be used in combination so as to visualize the edge uncertainty as produced by the noise signal guided/controlled segmentation but either of the two methods can also be used on their own completely divorced from the other

BRIEF DESCRIPTION OF THE DRAWINGS

Exemplary embodiments of the invention will now be described with reference to the following drawings wherein:—

DETAILED DESCRIPTION OF EMBODIMENTS

Figure 1:
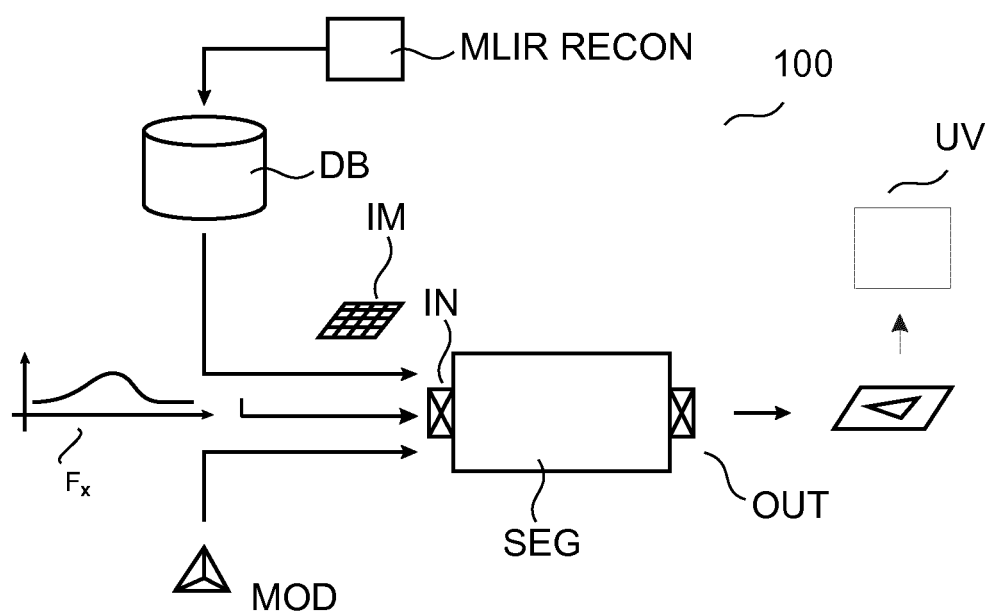
FIG. 1 shows an image processing apparatus according to a first aspect.

With reference to FIG. 1 there is shown an arrangement 100 with an apparatus SEG for utilizing noise information FX in images IM according to a first aspect. In its basic components the apparatus comprises a database holding images IM, a segmenter SEG with input port IN and an output port OUT.

Broadly, segmenter SEG reads in an image IM from database DB at its input port IN, image processes said image, in a manner to be described in more detail below, to produce at output port OUT a segmented image which than can be rendered for view on a monitor M or otherwise further image processed. Image segmentation is broadly the task of breaking up pixels or voxels in the image into chunks. The chunks normally represent and outline in shape objects of interest, for instance, in a medical context, the image footprint of a vessel or other organ.

The segmenter SEG as proposed herein runs a model based segmentation algorithm to achieve robust segmentation results by using both, image feature search and a priori knowledge about the shape of the organ. This means the segmenter harnesses previous knowledge on the approximate shape of the image portion to be segmented. This prior knowledge on shape is represented by inclusion of a model MOD into the algorithm. More particularly the model may represent in one embodiment a 2D or 3D mesh made up from mesh elements such as interconnected triangles. Broadly the algorithm operates to iteratively adapt an initial model mesh MOD to the image features in the image IM to be segmented. This adaptation is an iterative process which in this embodiment can be formulated as an optimization process constrained by an objective function, in particular an energy function E. Optionally there is also a visualizer UV whose purpose will be explained in more detail below at FIGS. 5-8.

The segmentation method as implemented by model-based segmenter SEG will now be described in more detail with reference to the flow chart in FIG. 2.

Broadly, the model-based segmentation method as proposed herein harnesses not only model MOD but also an explicit specification (symbolically shown in FIG. 1 as FX) of a spatially variable noise signal information in the image IM to be segmented.

At step S205 i) image IM is received and ii) the specification FX of the spatial distribution of noise signal levels across different locations in the image. In other words, according to the proposed method, not only the image IM itself is fed into the segmentation algorithm, but also an estimate of the spatial distribution of noise and it is proposed to use this additional (noise level) information during the segmentation as per step S210.

The noise specification can be via a collection of local variances a, or by specifying a parameterized family of probability densities or distributions for each image pixel in the to be segmented image. However other forms of noise information specifications are also envisaged so long as they are suitable to capture the spatial variability of the noise across the image IM pixels.

The image IM can be retrieved from database DB. According to one embodiment, the image is a reconstruction from projection images acquired of an object (patient, or other object of interest) by an imaging modality such as X-ray, CT or MRI. In one embodiment, the image is an MLIR reconstruction as produced by reconstructor RECON as will be explained in more detail further below with reference to FIGS. 3,4.

According to one embodiment, the noise distribution across the image is non-uniform, that is, the amount of noise prevalent is taken to vary across the image. In other words, there are at least two image portions with significant differences of noise levels.

At step S210 the model-based segmentation is applied to the model MOD. The segmentation step includes iteratively adapting the model MOD to different image locations to obtain a plurality of differently adapted models. The model adaptation is controlled by the different noise signal levels at the different image locations.

At step S215, the now segmented image is output with one of the adapted models defining the segmentation in the image IM. Image pixels in image IM that outline the adapted model's boundary (which may be a 2D surface or, in simpler cases, a 2D curve) defines the segmentation boundary. The adapted models boundary may define in a medical context the contours of an organ of interest, such as a liver or similar.

The segmentation in step S210 as per FIG. 2 will now be explained in more detail. In one embodiment, the model based segmentation step at S210 can be put mathematically as an optimization problem, where an energy cost function (that is, an objective function)

$$E(v) = E_{ext}(v) + \alpha E_{int}(v) \tag{1}$$

is to be minimized (this is without loss of generality as any maximization can be expressed as a minimization).

Subscripts ext and int, refer to external and internal energy, respectively. The parameter vector v denotes the set of vertex positions of the mesh of the ideal, initial model MOD. The external energy "attracts" the mesh vertices towards image features by deflection of vertices form the ideal shape MOD, while the internal energy, weighted by a, preserves the shape as dictated by MOD. Factor α is applied to make the two energy terms comparable. Initially, the model is rigidly (via translations and/or rotations) registered on the image IM. Then, non-rigid adaptations are applied in the following manner.

In one embodiment, the external energy is formulated by way of an image feature function that depends on gradients in the image IM. Feature search is carried out for the barycenter of a triangle $\hat{x}_i$ in the direction of its normal $n_i$ using $2l+1$ discrete sample points with spacing $\delta$ $$c_j = j\delta n_i, j = -l, \ldots, l \tag{2}$$

At every sampling point $x_i^j = \hat{x}_i + c_j$, a feature function is evaluated and finally the destination point $x_i^{dst}$ is chosen that best combines feature value F and distance $j\delta$ to the barycenter of the triangle, for instance:

$$x_i^{dst} = \min_{x_i^j, j=-l, \ldots, l} \{D_j^2 \delta^2 - F(x_i^j)\} \tag{3}$$

with a distance weighting factor D which acts to penalizes far off sampling points to better trade-off feature fitting with distance.

Attraction or deflection of the mesh vertices to image features can be accomplished by evaluating various feature functions, for instance gray value templates which encoded the expected pixel pattern (in a neighborhood with radius of say 1-2 mm) at the locale of the respective mesh triangles. In one embodiment, the feature function evaluates the image gradient in the local neighborhood $$F(x_i^j) = s \cdot n_i^T \nabla I(x_i^j) \frac{e^{\frac{\|\nabla I(x_i^j)\|}{g}}}{1 + \frac{\|\nabla I(x_i^j)\|}{g} e^{\frac{\|\nabla I(x_i^j)\|}{g}}}, \tag{4}$$

where the parameter $s=\{-1, +1\}$ accounts for the expected gradient orientation, distinguishing between dark objects on bright background and vice versa. The quantity $n_i^T$ denotes the outwards pointing mesh surface normal vector. The scalar product between the local mesh normal and image gradient is maximal in magnitude for equally directed vectors. The gradient response is bounded by a threshold g, with the fraction term in equation 4 limiting the influence of locations with very large gradients. In other words, image features in the image (space) surrounding the initial ideal model MOD are sampled by local evaluation of gradient based image feature function F as per equation 4. The image feature sampling at sampling step $\delta$ occurs along the respective normals of the vertex point triangle at respective destination points. Those destination points that cause a high feature function response are then considered possible candidate target points to which the model's MOD vertices are deflected to so form a deformed or adapted model. In this manner, for a plurality of destinations points along each normal one arrives at a plurality of differently deformed/adapted models. An objective function, in this case the energy function E, provides a criterion to decide which one of the plurality of differently deformed/adapted models is eventually to define the sought-after segmentation. The energy function E is then evaluated by iteration or looping over said plurality of destinations points to find the optimal configuration of the destination points. The collection of the optimal destination points then defines the vertices of the segmentation which is then output at step S215.

Considering the energy objective function in more detail, with the detected destination points $x_i^{dst}$ the external energy term is given in a, in one embodiment, quadratic form $$E_{ext}(v) = \sum w_i \left( \frac{\nabla I(x_i^{dst}) \nabla I(x_i^{dst})^T}{\|\nabla I(x_i^{dst})\|^2} (x_i^{dst} - fM_iv) \right)^2 \tag{5}$$

where $M_i$ allows expression of the vertices v of model MOD in terms of the triangle centers and $w_i$ is a weighting factor. The projection of $(x_i^{dst} - fM_iv)$ onto the image gradient at the destination position makes the energy invariant to movements of the triangle within the object tangent plane, preventing the triangle from becoming "stuck" at the destination position and therefore preventing the optimization from getting trapped into local minima. The weights $w_i$ can be chosen according to the feature value of the respective destination points to give the most promising points the largest influence during mesh reconfiguration/adaptation. In other words, those image features (as measured for each of the destination points along their respective normals from model) that best fits the shape characteristics of model MOD will attract the higher weights $w_i$. Most promising points may mean in some embodiments that well pronounced edges are preferred over less pronounced ones.

Each summand in $E_{ext}$ (v) represents the "evidence" that the surface of the organ or object one wishes to segment is located at image location $M_i v$. It measures the amount of deflection or "cost" that need to be expended in order to deflect the model point to the respective points $M_i v$. It is then proposed herein to incorporate the supplied noise specification level at the destination points $x_i^{dst}$ into the segmentation process. In one embodiment, the noise level is specified in form of a collection of local noise levels $\sigma_i$ measured by the local variances at each image point. Incorporation the respective local image noise information into segmentation step S210 is in one embodiment by modifying the external energy term in equation 5 as:

$$E_{ext}(v) = \sum \frac{w_i}{\sigma_i^2} \left( \frac{\nabla I(x_i^{dst}) \nabla I(x_i^{dst})^T}{\|\nabla I(x_i^{dst})\|^2} (x_i^{dst} - M_i v) \right)^2 \quad (6)$$

In other words it is proposed herein to use noise adapted weights that respond differently to different levels of noise. Equation 6 describes how the iterative model adaptation (given by $M_i v$) is controlled. Model points $M_i v$) are deflected towards different image locations $x_i^{dst}$, wherein a "strength" of the respective deflection action (as embodied by the noise qualified weights $$\frac{w_i}{\sigma_i^2})$$

varies inversely with the local noise signal level at the different locations. The variation of the deflection strength is achieved by applying a noise level dependent weight $$\frac{w_i}{\sigma_i^2}$$

to the external energy term of objective function E to thereby drive the optimization of the segmentation step.

Other formulations of the above are also envisaged so along as the noise level dependent weight is applied to the term or that part of the objective function that represents or measures the level of attraction of respective model points to different candidate locations in the image space.

For instance, in one embodiment as per equation 6, higher weight is given to image locations were noise is less, and less weight is given to highly noisy image points or areas. In other words, equation 6 is so fashioned that the optimization process trusts high noise image points less than those with low noise level. In yet other words, there is a tendency to more willingly abandon the ideal shape as embodied in the initial model for image features at candidate destination points with low noise levels. Conversely, if the noise level at an image point towards which a deflection is contemplated, is high, the optimization process is biased to not deflect model vertices towards that point but rather retain the ideal shape as defined by model MOD.

Using a noise dependent, spatially adapted (that is, varying across the image plane) weighting parameter $w_i$ for the external energy, is very much unlike what has been previously proposed where the weighting parameter a was selected empirically as a global constant with the external energy being depend only on the image ("face"-)values, with no consideration given to local noise information.

The proposed method works best with images having noise distribution with high spatial variability. Only then does the selective controlling function of the noise information FX come to bear in equation 6.

It has been found that suitable images to which the proposed method can be applied to with benefit are images reconstructed by iterative reconstruction methods such as maximum likelihood iterative reconstruction (MLIR). The noise level distribution in those images was found to vary strongly within the image. The unusual noise distribution of MLIR images compared to filtered-backprojection images is evidenced in image examples as per FIGS. 3 and 4. In MLIR images, the image noise is only (or mostly) present at strong gray-value gradients while homogenous images areas are virtually noiseless. In other words, this property can be harnessed by the proposed method to find edge regions using the noise levels as clues and to nudge the optimization along the edges but with a tendency to avoid model adaptation towards points in highly noisy edges themselves. In the edges themselves, the influence of the shape preserving internal energy term takes then precedence.

Figure 3:
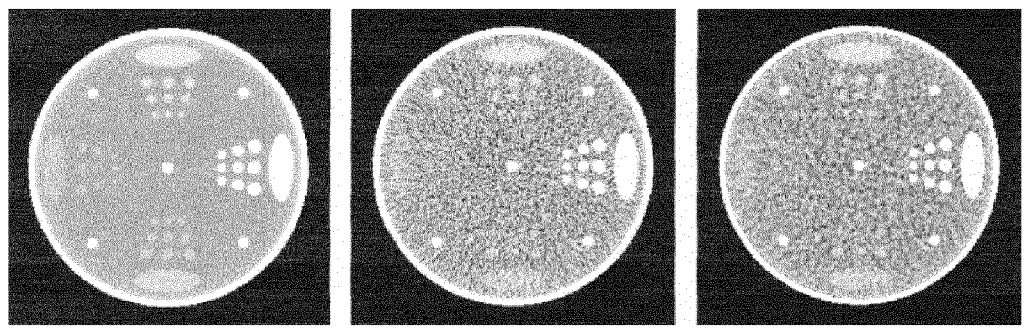
FIG. 3 shows noise distribution in MLIR reconstructed images.
Figure 4:
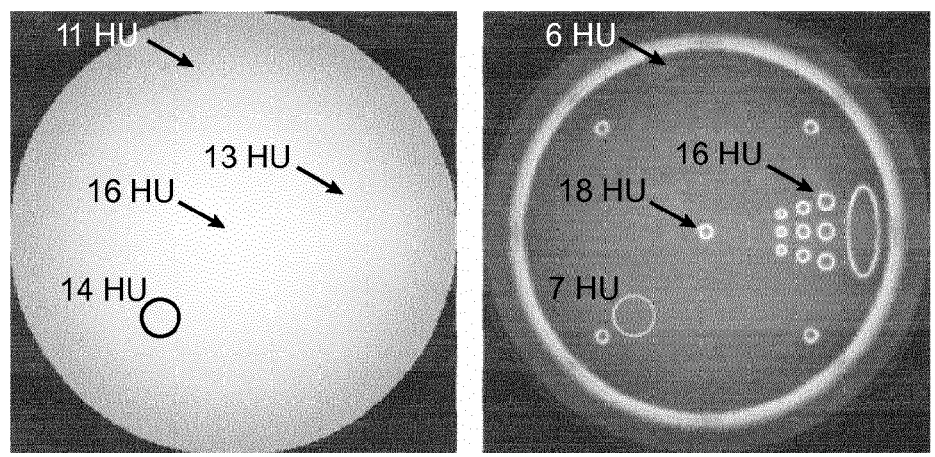
FIG. 4 shows how noise distribution varies in images that have been reconstructed according to different methods.

FIG. 3 shows, from left to right: a phantom, a sample reconstruction using conventional filtered backward projection (FBP), and a sample reconstruction using MLIR. FIG. 3 demonstrates that MLIR reduces the noise in the homogeneous background area by factor of 2, while the high contrast objects are still reconstructed sharply. FIG. 4 shows noise levels in the FBP reconstructed image (left) and in the MLIR reconstructed image (right).

The noise levels shown if FIG. 4 for FBP and MLIR reconstructions were generated by evaluating an ensemble of a few thousand noise samples. FIG. 4 shows that the noise level in MLIR images depends strongly on the image itself, with a much lower noise level than FBP in homogeneous areas and at low contrast edges but even higher noise than FBP at high contrast edges. The noise level in the FBP images depends less on the image features and shows only smooth transitions in the reconstructed image. Translating these observations to an segmentation scenario like liver segmentation, where the contrast to adjacent organs/tissue varies strongly (high contrast to the lungs and ribs, medium contrast to the fatty tissue in the abdomen, and low contrast to the muscles and other adjacent abdominal soft tissue structures), it becomes apparent that the assumption of a constant noise level across the entire image is not adequate and in contrast the proposed method allows accounting for non-uniform noise levels and to use this information to control a model based segmentation optimization.

According to an alternative embodiment of incorporating the noise information into the segmentation optimization, it is proposed to use a noise map as an additional feature during segmentation. A noise map is an image derived from the initial image IM to be segmented, where the pixel in the noise map encode the level of noise. For instance, one way to generate a noise map, is to compute the local variances $\sigma(x,y)$ at each position x,y in image IM. The array of local variances $\sigma(x,y)$ then forms the noise image. In this embodiment, an additional external energy term $E_{noise}(v)$ can be added. Analogous to the feature search in initial image IM as per equation 4, this new term now measures and controls, that is responds, to a search for high noise values in the noise map. For instance, analogous to equation (4), F can be made to (also) operate (that is search) in a noise map of image IM.

This parallel search for "noise features" can then be combined with the search for gradients in the normal image to form a new objective function as $$E(v)=E_{ext}(v)+\alpha E_{int}(v)+E_{noise}(v) \qquad (7)$$

The new term represents the noise signal level at each of the different image locations and responds to high noise levels. In other words, noise level term $E_{noise}(v)$ varies directly with noise level. The response strength or amplification can be adjusted by using a suitable model function, for instance $1/\sigma$. In other words, new noise term acts to penalize locations with higher noise signal thereby driving the optimization. This embodiment may be used for noise maps that exhibit a similar behavior as the image to the right in FIG. 4, that is, exhibit concentration of high noise level variance mostly at edge portions of the image.

The noise penalizing weights, in multiplicative or additive form, can be used together with further weights that act to penalize non-smooth displacements of the mesh points or displacements that would violate constraints imposed on an assumed "elasticity" of the model MOD. Physical concepts from material science or solid mechanics such as elasticity theory can be used to formulate, for instance, said elasticity constraints for the mesh model. Indeed, the very term "internal energy" as used herein echoes this borrowing from solid mechanics for present purposes. A non-smoothness measure can be for instance the surface integral over the absolute changes in the displacement vectors along the assumed model surfaces. Example for measures that model those physical elasticity constraints are fashioned to evaluate whether the given displacement corresponds to a "physically sensible" "stretching" or "bending" of the model. These smoothness measure terms and said measures that model the physical constraints are combined in one embodiment into the internal energy term which acts to retain the model close to its unperturbed (not adapted, original) shape.

Figure 5:
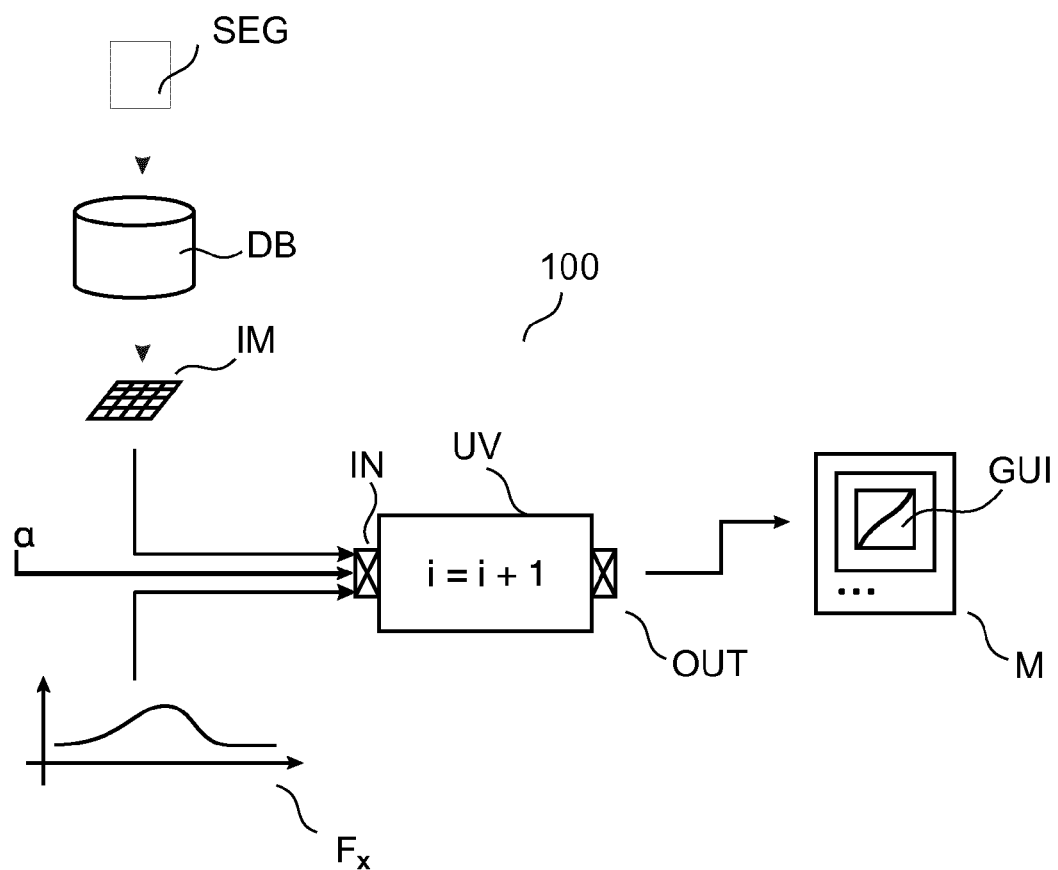
FIG. 5 shows an image processing apparatus according to a second aspect.

With reference to FIG. 5, there is now shown, in more detail, visualizer (UV). Visualizer UV includes as its basic components an input port IN and an output port OUT. Although shown together in a system or arrangement together with segmenter SEG, visualizer UV may be used completely stand-alone just as the segmenter SEG can be used stand-alone without the visualizer UV.

Broadly, visualizer UV receives an initial image IM its input port IN. Image IM can be held in database DB or other storage facility and is retrieved therefrom or is supplied directly by an imager after an imaging run after processing by an image reconstructor RECON and, optionally, further processed by image segmenter SEG. Further input is a user definable confidence level α and a specification FX of the local noise levels at the pixels in image IM similar to the specification as explained earlier in FIG. 1. The initial image IM is then image-processed by visualizer and produces at output port OUT at least one modified version of said initial image. In one embodiment the so modified image is included in a graphical user interface GUI. The modified image or images IM, LW (with or without the graphical user interface GUI) can then be rendered for view on monitor M.

The visualizer UV can be used with particular benefit (although this is in no way limiting) when initial image IM is obtained from an iterative reconstruction with edge-preserving regularization. Those images have very low noise levels and well defined, "hard" edges. Yet, there can still remain an uncertainty in the position of the edge pixels, that is, the width and course of the edges. The structure of the image information in the initial image is often such that it includes plateaus of higher and lower mean pixel values. "Plateaus" are closed image portions in the image bordered by edges, which can be found by standard edge-detection methods like the Canny edge detector. The plateaus define a "valley" or edge region in between the two plateaus, the edge being defined by the "interface" (region) between the two. Edges usually outline a footprint of certain objects of interest for instance such as bones, vessels or other organs such as the liver. For instance the higher plateau may indicate pixels that encode the attenuation/density of liver tissue whereas the pixels of the lower plateau encode attenuation/density of the surrounding (fatty) tissue.

This edge uncertainty is normally not easily appreciated by the user. In general it is to an observing user far from clear whether an edge point belongs to the high or low plateau. The uncertainty as to which pixels form part of the edge drops with increasing distance from the edge as more and more pixels can be expected to have similar non-edge values and therefore there is less variance than with pixels located close to the edge. A visualization of this uncertainty may help the user to understand which part of the reconstructed edge region is "trustworthy". One example where an appreciation of this uncertainty would play out beneficially is in image-based diagnosis of arterial stenosis or in image-based diameter measurements of low contrast lesions. Both depend on accurate measurements and having tools at hand that aid in quantifying the measurement errors due to said "edge uncertainty" would be welcome.

The at least one modified images HI,LW as generated by visualizer UV allow(s) the user to visually assess the uncertainty (due to prevalent noise signals) in respect of course of the edge in the initial image. The user is presented graphically the possibility of an edge pixel to belong to either of the adjacent plateaus. No additional graphical overlays etc. are necessary. The user can quantitatively derive the uncertainty from the extent of the pixel changes (as shown in gray-scale level or Hounsfield units) by comparing the high HI, low LW images with each other or with the initial image IM.

Figure 6:
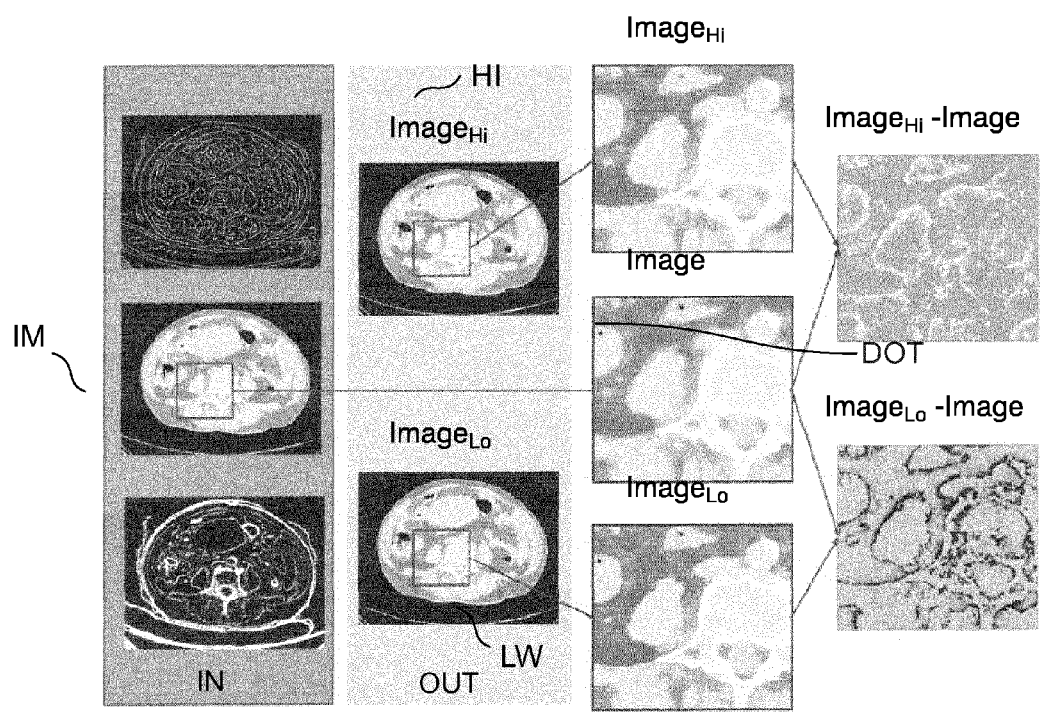
FIG. 6 shows schematically images produced by the apparatus of FIG. 5 and a schematic rendering of a graphical user interface.

FIG. 6 shows a very schematic sketch of how the modified images HI,LW compare to initial image IM (at the same time, FIG. 6 serves as a schematic representation of the graphical user interface GUI including the images but the functionalities of the GUI will be explained in more detail below at a later stage).

The image elements (voxel or pixels) are shown as small squares from which each of the three images IM,HI, LW are formed. The edge region in initial image IM is represented as squares forming the diagonal and shown in heavy hachures. The higher plateau pixels are shown in clear squares whereas the lower plateau pixels are shown as the collection of squares in light hachures. As briefly mentioned above, the noise level prevalence in the image information causes uncertainty whether a certain edge region pixel EPX is actually a lower plateau pixel or a higher plateau pixel. This uncertainty is schematically shown as arrows bearing the "?" pointing either way. In other words, in FIG. 6, the squares in heavy hachures are "balance points", that is, they could fall to either side of the two plateaus so could be high plateau pixels or low plateau pixels.

Figure 7:
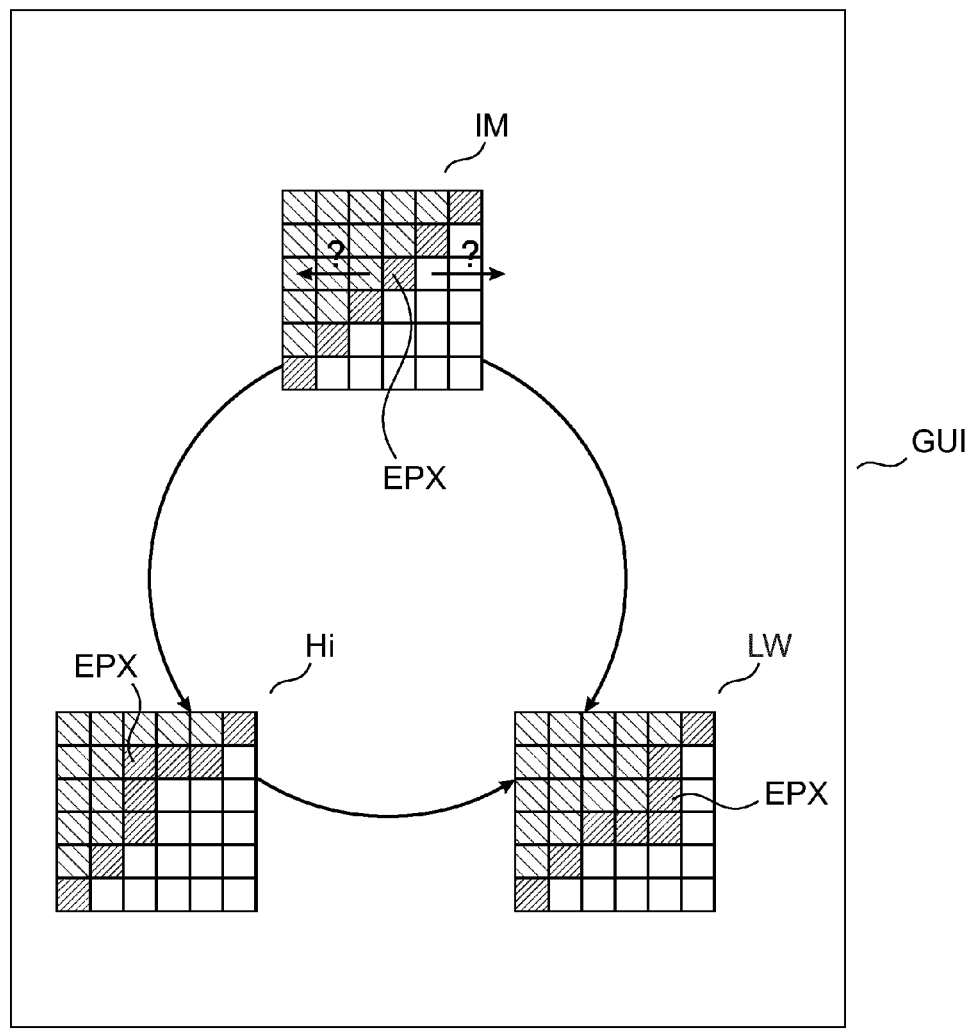
FIG. 7 shows input data and output data of the apparatus in FIG. 5.
Figure 7:
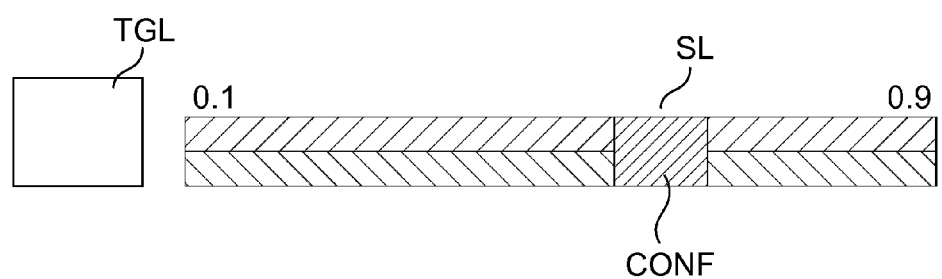

Briefly and as will be explained in more detail below, visualizer UV may operate to change (or, on occasion, to leave alone) the edge pixel EPX's value by "downshift" downwards to the value of neighboring lower plateau pixels to produce the low image LW thereby modifying the initial image IM locally. On the other hand, visualizer UV may operate to locally change initial image IM by "upshifting" the edge point EPX's value upwards to the upper plateau pixels to produce the high image HI. As can be seen in FIG. 7, the change due to up/or downshift propagates to the neighboring pixels of the changed pixel EPX. This reflects the iterative nature of the proposed method. Once the uncertainty (at level α) in respect of the balance points (heavy hachures in FIG. 7) has been resolved, the same questions (high or low plateau pixel?) can be asked in respect to the neighbors of the up or downshifted (or retained) pixel values. This is indicated schematically in FIG. 7 in that now a neighbor pixel of the previously processed pixel EPX is shown in heavy hachures instead. In this manner the algorithm can in one embodiment proceed iteratively (the iteration will be explained in more detail below at FIG. 8) away from the original edge, thereby effectively changing the course of the edge itself. In other word, in the high image, the high plateau essentially expands or "spills over" into the previously low plateau area (the area defined by the clear squares "grows") whereas in the low image LW it is the low plateaus that gains ground in expense of the high plateau (which is schematically shown in the Figs by growing of the area defined by the light hachured squares).

In other words, the high, low images HI, LW are graphical renderings of hypothetical "what if?" scenarios at a given confidence level, because they represent what the edge region would look like if the respective edge point was to belong instead to either one or both of the two plateaus.

FIG. 7 is a basic overview of the various inputs and outputs involved in the method as proposed herein. The leftmost column with three panes shows in the middle pane the initial image IM (in this case, image IM is a CT slice reconstructed from projection images obtained in an imaging run). The top pane in said column represents any "edge image" of the edge regions of initial image IM. The edge image can be obtained by having the initial image processed by an edge detector such a Sobel or Canny operator. Top pane shows a noise specification in form of a noise map which shows the distribution of the uncertainty across initial image. In this embodiment, the specification is in the form of a noise image or map as obtained from the initial image for instance by locally evaluating the local variance in the usual manner. Centre column shows in upper pane the high image HI and in lower pane the low image LW obtained by operation of uncertainty visualizer UV. The third column includes, as optional outputs, close-ups of the respective three images to better show the local dynamics of the edges. For instance, although the initial image shows a dark dot DOT on a plateau, the high image HI does not. This indicates the uncertainty in respect of the image structure represented by said dot DOT. The final, fourth column shows an optional output in form of two (pixel-wise) difference images taken between the initial image and the low LW image and/or the high image HW, respectively. The exemplary imagery in FIG. 7 is based on total variation denoised CT image. Edges where extracted using a Canny edge detector. The uncertainty in the denoising result was estimated by running a total variation (TV) denoising with 100 different noise realizations of additive Gaussian noise. 10 Iterations were done with the proposed method. The output Image HI and Image LW evidences that low contrast areas are subjected to substantial shrinkage or expansion that varies with the underlying uncertainty. The changes are more easily visible in the difference image with respect to the original image IM.

Figure 8:
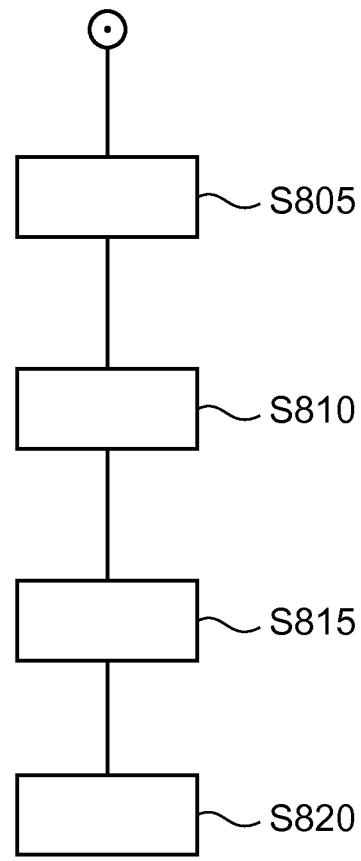
FIG. 8 shows a flowchart of an image processing method according to a second aspect.

How the modified images low LW, high HW are gotten is now explained with reference to flowchart in FIG. 8 where the basic steps of the method as implemented by the uncertainty visualizer UV is shown.

At step S805, is received i) the initial image, ii) the noise specification, iii) the edge information and iv) the confidence level α that is, a number a, with 0<α<1 but α>1 is also envisaged in some embodiments).

The edge information specifies which image portions form edges (edge regions). To this end, an edge detector is applied to initial image IM, which automatically determines the edges/edge region, for which uncertainty information is to be visualized. The detection of edges can be done with well-known methods like the Sobel operator combined with a threshold, or a Canny edge detector. Edge detection operators calculate the gradients in the image values in each point of the image. Positions with high absolute gradient values above a defined threshold t are detected as edges. Furthermore, methods like the Canny edge detector only allow for such detected edges that are connected as line segments. The so marked up edge points as returned by such an edge operator are shown as the heavy hachured squares in FIG. 7. The collection of detected edge points can also be supplied by the edge detector in an "edge image" where pixels other than the edge pixels/points are masked. This provides a pool of the edge points in the initial image to which the following steps can then be applied to.

Figure 2:
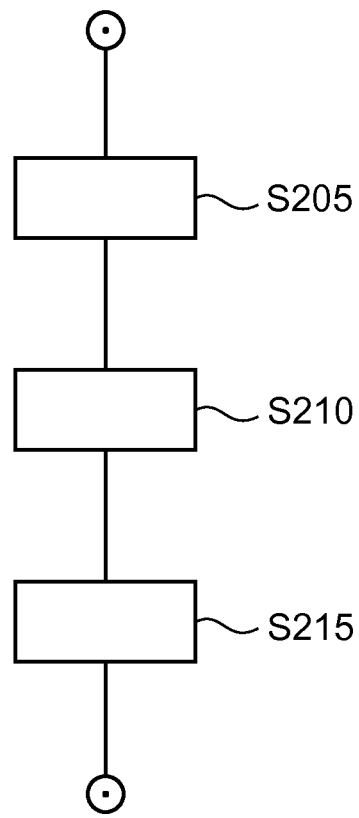
FIG. 2 shows a flowchart of an image processing method according to a first aspect.

The image noise specification can be supplied in different forms as mentioned in the previous embodiment in FIG. 2. In one embodiment, the noise specification includes a definition of a spatially varying probability distribution to describe the noise (levels) across the image. For instance, the noise specification may be based on an approximately known probability density function for each pixel, e.g., a Gaussian with known variance.

In one embodiment, the noise specification may capture the estimated noise level that is introduced into the image upon its generation. For instance, in computed tomography (CT), the noise in the projection raw data (as registered at the imager's detector) can be efficiently estimated and then be propagated to the image using known propagation of uncertainty methods. More specifically, noise signal in a CT image can be derived, e.g., from the variance of the projection raw data, which can be directly estimated. Using error propagation one can estimate the amount of noise being reconstructed into the individual image voxel, e.g., using filtered back-projection (FBP) reconstruction methods.

Alternatively, noise can be estimated in the image space itself from the local variances in each image voxel. Suitable probability density functions or models for it, which do not necessarily have to be Gaussian, can be derived from reconstruction experiments with various noise realizations in the raw data.

The confidence level α is supplied by the user via textual or GUI input (on which more later). In the alternative, the confidence level is pre-set set as a system variable.

Based on the edge information and the noise specification as locally applicable said point, an uncertainty (as quantified by confidence level α) at an edge point is evaluated or computed at step S810.

Based on said evaluation, the initial image is processed at step S815 to generate at least one of the two additional images, the high image HI and/or the low image LW. Preferably, both images LW,HI are generated. In one embodiment, the user may specify which one (or both) of the two LW,HI images are to be generated.

Generation at step S815 of the additional images LW,HI is, as indicated earlier, essentially a pixel value change (down or upward shift) operation of the edge region pixel values in image IM. Individual edge point EPX is merely used as an example herein with the understanding that the following computations in relation to steps S810,S815 are to be performed for essentially all pixel values that form part of the identified (at step S805) edge regions as identified by the edge detector. However, in other embodiments the operation of visualizer UV may be so restricted that the computations are not applied to all edge region pixels, but the user can specify for which edge portions the confidence computation are to be executed. In this embodiment with restriction option, it is envisaged that the edge image (as derived from running the edge detector on initial image) is initially (that is, before execution of steps S810, S815) displayed in the GUI and selection of edge portions is by mouse click or (in a touch screen embodiment of monitor M) touch screen user action on the respective edge image portions.

As briefly outlined above with reference to FIGS. 6,7, The low image LW represents a modified version of initial image IM, but now, in accord with the confidence level, with edge pixel EPX having a lower value instead of its original value. In step S815, edge pixel's original value is downshifted until the specified confidence level (as used in step S810) is reached or satisfied. However the amount by which the pixel EPX value is downshifted is "capped" so that the modified pixel EPX value will not fall below the mean grey value of the adjacent low plateau next to the edge of said pixel point EPX. Similarly but conversely, high image HI is gotten from initial image IM by upshifting at step S815 edge pixel EPX's value rising according to the confidence level (as used in step S810) but not above the adjacent high plateau level. Both images now represent visually the two scenarios at the specified confidence level that the pixel might belong to the upper or the lower plateau. Of course it may be the case that the evaluation is respect of the current pixel value of edge pixel EPX is inconclusive. In this case, the current pixel value of edge pixel EP X is maintained. As schematically shown in FIG. 6, once the uncertainty (at level α) of whether edge pixel could be a high or a low plateau pixel has been resolved, the previously "uncertain" edge pixel EPX (previously shown in heavy hachured square) is now shown as a clear square in the high HI image and/or as a square in light hachures in the low image LW.

In the following, two embodiments will be described of how the local noise (as specified in the noise specification) can be evaluated at step S810 to tell whether or not the confidence level α is or is not satisfied.

In one embodiment it is assumed that the noise at each pixel is governed by separate probability distribution each having their own respective standard variance which in turn various across the image pixels. In other words, in one embodiment to each pixel is attached a spatially variable Gaussian distribution, each with their own standard variance σ(x,y) at pixel position x,y (x,y are in-image coordinates).

In one embodiment the confidence level α is multiplied with the respective standard variance at position x,y. It is then checked whether a neighboring upper or lower plateau pixel values (f_high, f_low, respectively) are within the confidence range as per f(x,y)+−alpha*sigma(x,y), where f(x,y) is the pixel value at image position x,y. If yes, that is, if either or both of f_high, f_low is/are within the confidence range, this is taken as a token that there is sufficient uncertainty as to the current pixel value f(x,y). Therefore, in the high image HI (otherwise identical with initial image) f(x,y) is upshifted to assume the value f_high if f_high is within the confidence range. Similarly, if f_low is within the confidence range, then f(x,y) is downshifted to assume the value of f_low to so form a pixel in the low image LW. The situation as shown in FIG. 7 is such that indeed both f_high and f_low are in the confidence range, so there is a pixel change in both, the high HI and low image LW. Alternatively to the above, the pixel value f(x,y) may be up or downshifted by a lesser amount so is not necessarily changed into f_high or f_low. In this embodiment, it is envisaged to change the pixel value EPX by a fraction of the difference between EPX and f_high or f_low. If edge point EPX happens to have neighbors from different plateaus, than the previous evaluations are carried out separately for each and finally it is the highest f_high and and/or lowest f_low value into which the edge point is changed or from which the fraction for the up/downshift is computed.

If neither f_low nor f_high is within the range, then the current pixel value f(x,y) is maintained and can be trusted (that is, the evaluation is inclusive) with confidence level α.

In sum, at each iteration step, either the high image HI or the low image LW or both may differ at f(x,y) from the initial image or there may be no change when the pixel value f(x,y) is maintained and the three images have the same entries at said maintained point f(x,y).

In an alternative embodiment, it is assumed that the noise level is described by a probability density function for at least is given by the probably distribution function $P(F<=f|x,y)=\int_{-\infty}^{f} p(t|x,y) dt$. With p(t|x,y) being the probability density function for an image value t at the position (x,y). In this case, the respective probabilities at the respective positions (x,y) are evaluated as per $P(F<=f\_low|x,y)$ or $P(f\_high<=F|x,y)$. In this case, F is a random variable for the pixel value at x,y (inclusive of the noise contribution) and the probability is computed that the pixel value at image position (x,y) is outside the bounds f_low, or h_high, that is, that the pixel value is less (or equal) f_low or is greater (or equal) f_high. It is then evaluated whether those probabilities are greater than the confidence level α (which in this embodiment indicates a probability). If they are, the pixels value is upshifted or downshifted as previously described to either f_low or f_high. For instance, if $P(F<=f\_low|x,y) \geq \alpha$ there is ground (at confidence level α) to believe that f(x,y) is a low plateau pixel and f(x,y) is changed into f_low or is changed into f_high if $P(F>f\_high|x,y) \geq \alpha$ respectively. Again in both embodiments and as mentioned earlier the amount by which the pixel values are changed is capped by either one of the lower and/or upper plateau pixel values.

As will be appreciated from above, when steps S810, 815 are applied to all edge region pixels, the course and or extent (e.g., "width") of the initial edge region (as encoded in the initial image IM) will in general change as evidenced by the new edge recorded in the high and/or low image. The course of the changed edge in each image is tracked. The method can now proceed in an iterative fashion based on the high and/or low images. The pixels in the neighborhood of the changed pixel EPX are now considered new edge points. The new edge points are then included into edge images of the low/high image. Steps S810,815 are then reapplied separately to the two images LW,HU to restart the iteration by evaluating the new edges. Upshift changes (in either image LW,HI) will be applied to the high image whereas downshift changes will be applied to the low image. New high and/or low images are then formed. In other words, new edge points that are now at the interface between high and low plateaus will emerge which is shown in FIG. 6 by redirection of the run of the heavy hachured squares that initially ran along the diagonal. In one embodiment steps S810,815 are therefore iteratively applied, that is, steps S810, S815 are repeated and applied separately to each of the previous high and low images. In this manner, a respective sequence or "stream" of high and low images are generated each showing a more or less pronounced change in the extent/course of the updated edge regions as encoded therein. However, the uncertainty as to whether a pixel is a high plateau pixel or is a low plateau pixel is expected to decrease with increasing distance from the original edge region as recorded in initial image IM. In other words, the plateaus will to a lesser extent "spill over" into each other and the method as proposed herein naturally converges because more and more of those far off (from the initial edge) pixels, when evaluated at step S810, will turn out to be very similar within a margin so the amount of down- or upshift will be more and more minute. Iterations can be aborted after a fixed number of iteration runs. Alternatively the differences between the subsequent low images LW and/or subsequent high images HI can be computed. The respective "high" or "low" iterations abort once the difference is found to be below a predefined difference margin in each of the receptive streams.

In step S820 the images HI, LW are the displayed on a monitor. In one embodiment, the image(s) is/are displayed in a GUI whose functionalities will now be explained in more detail. In one embodiment, it is only the final high and/or low images that are displayed, that is, the display occurs only after the iterations aborted. In another embodiment, the respective intermediate images LW, HI are displayed during the course of the iteration. The high and/or low images are sequentially displayed, with the earlier one phased out and the more recent one phased in as they become available with each iteration step. In other words, the high and/or low images are respectively updated so that the user can see how the edge's course and/or extent (width) is changing as the iteration unfolds. In one embodiment, the visualizer UV is user configurable between these two display behaviors. GUI functionalities Referring back to FIG. 6, in one embodiment the GUI includes a main pane in which the images (that is, the low image LW and/or the high image HI and/or the initial image IM) are displayed. In a separate GUI portion (which in FIG. 6 is formed by the bottom portion but this is merely one GUI design and GUI portion may be placed instead on the top or may run down the left or right side of GUI main pane), there are arranged a number of GUI widgets salute the user can invoke one or more of the following functionalities.

According to one embodiment there is a GUI widget formed as slide bar SL with slider button CONF slidable over bar SL. The slide bar has a scale that indicates the various confidence levels ranging, as an example, between 0 (not included) and 1 (not included). This allows the user to adjust the desired confidence level at which the high/low images are to be produced. Initially it is envisaged that only the initial image IM is displayed. The user then triggers the above described iteration to produce the high/low images HI,LW by clicking for instance any portion of the image or by hitting a key on the keyboard or similar or by specifying the α level by positioning the slider SL accordingly. The high/low images HI,LW, once produced, are then displayed instead of or alongside with the initial image. If a different confidence level is desired, the user repositions slider button CONF. Said Repositioning of slider CONF then triggers a rerun of the above described steps S810, 815 and new high low images are produced at the updated confidence level and then rendered for display in the GUIs display pane. According to one embodiment only one of the three images (initial IM, high HI and low LW) is displayed at a time and the user can effect toggling between the three images or only between the high/low HI,LW images.

For instance, by toggling between the lower LW, the original IM and the upper bound image HI, the user is afforded a visual impression of the level of uncertainty as to the extent of the edge region. This is reflected in edge pixel's apparent motion (caused by the toggling to and fro) between the two different plateaus. Highly uncertain edges will have a much higher "pixel value moving range" between the two images LW, HI than edges with less uncertainty, whose pixels will remain essentially at the same position in all images. Toggle button TGL allow the user to progress through the toggling cycle. In one embodiment, the toggle cycles are adjustable by way of pop-up window that pops up when the mouse cursor is made to hover over Toggle button TGL but this is merely one embodiment for supplying or specifying the toggling sequence and other input means, e.g., text-based or otherwise are also envisaged herein: according to one embodiment the toggling sequence is such that between any two IM,LW images there is an IM initial image instance: IM->LW->IM->HI->IM-> and so on. However, other cycling patterns are also envisaged for instance LW->HI->LW->HI-> where the initial image is skipped and toggling is between the high and low images which are repeatedly displayed in turn one after the other. In one embodiment, toggling is only between the initial image and the high image high HI or only between the low LW image. In FIG. 6 the toggling is schematically indicated by the curved arrows representing the transitions between the images. On course the are other embodiments, where all three images IM,LW,HI are displayed at the same time.

In one embodiment, pixel-wise difference images are formed between original image IM and either one (or both) of the lower LW and upper HI confidence image as indicated in the rightmost column of FIG. 7. In one embodiment the respective one of the difference images is displayed in its own right or the difference image is overlaid on the initial image using a color coding for instance.

In one embodiment GUI includes a user operable zoom functionality to generate "close ups" of image IM, image HI or image LW as per FIG. 7.

Referring briefly back to the restriction functionality mentioned above (that allows a user to restrict in which portions of the image the edge uncertainty is to be visualized), this can be implemented by means of the GUI as follows. The user specifies by pointer tool or finger touch action is certain edge portion of interest in the image IM as initially displayed in the viewing pane of the GUI. Said edge selection may also be effected by the previously mentioned zooming tool by zooming into the edge portion of interest. Once the edge portions are so specified, the previously described method steps S810, S815 are executed for the so specified edge portion only. In other words "sub"-high and "sub"-low images are generated that describe the edge uncertainty only for the selected edge portion. Again the user can use the toggling button TGL toggle between to two sub high and low images that represent the edge-positions as upper or lower plateau pixels. Additionally in all the previously mentioned embodiments, the pixel values can also be shown numerically as little pop-ups associated with the higher and lower plateau. This allows the user to also quantitatively assess the uncertainty prevalent at the edge or selected edge portion.

In one embodiment, for a specific lesion, stenosis or other segmented structure as defined by segmenter SEG (or indeed by any other segmenter), a mean contour based on the noise specification could be shown along with the min/max contours at the given confidence threshold. For instance, the expectation value of the probability distribution can be computed or looked up in suitable tables. The local expectation values are then color coded for instance and respectively overlaid at the edge point of the edge region of interest.

The GUI can be programmed by using widget libraries and the visualizer includes a event-driven GUI generator module configured to interface with a video card of the workstation to drive monitor M. The event driven generator intercepts and interprets user event such as mouse click, stylus or touch-screen events which then triggers the above described GUI functionalities.

Although each of the apparatus SEG, UV can be used separately, in one embodiment, the two are connected together to form an image processing system 100. Apparatus UV can then be used to visualize the uncertainty of edge regions in an image that has previously been segmented by apparatus SEG.

In will be appreciated that the above two methods can be applied to dual energy images with different noise level per energy channel.

Also, it will be appreciated that the term "image" as used herein does not necessarily entail cubic voxels. For instance, the reconstruction of the image IM may be based on other basis functions than cubic voxels. For instance, in MLIR, generalized Kaiser-Bessel windows functions (also known as blobs or blobs basis functions—essentially a scaled and piece-wisely defined variant of the Bessel function) may be used instead.

The apparatus SEG,UV may be programmed in a suitable scientific computing platform such as Matlab® and then translated into C++ or C routines maintained in a library and linked when called on by a work station of an X-ray, CT or MRI imager. Matlab for instance, features an "image processing toolbox" with a SOBEL operator module. The components may be arranged as dedicated FPGAs or as hardwired standalone chips.

In an embodiment, apparatus SEG,UV are software components resident in work station running thereon as software routines. However, distributed architecture embodiments are also envisaged where imager processors SEG, UV are connected in a suitable communication network with one or more imager workstations.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. Method for image processing, comprising the following steps of:
    receiving an image a specification of a spatially varying distribution of a noise signal level across different locations in the image;
    segmenting the image for a model, wherein the segmentation step includes an iteration to iteratively adapt the model to different image locations to obtain, during the course of the iteration, a plurality of differently adapted models, wherein the model adaptation is controlled by the noise signal level at the different image locations;

outputting one of the differently adapted models, the output model outlining a segmentation of the image, wherein the controlling of the iterative model adaptation includes deflecting a model point towards said different image locations, wherein a strength of the respective deflection action varies inversely with the local noise signal level at the different locations.

2. Method of claim 1, wherein the variation of the deflection strength is achieved by applying a noise level dependent weight to a term of an objective function to drive an optimization process for the segmentation step, wherein said term measures an attraction level of the model point to the different locations.

3. Method of claim 1, wherein the segmentation step includes computing an objective function to drive an optimization process for the segmentation step, wherein the optimization process includes iterating through the different locations, wherein the objective function comprises a plurality of terms each representing a different objective, wherein one of the terms represents the noise signal level at each of the different image locations, wherein said noise term acts to penalize at locations with higher noise signal level.

4. Method of claim 1, wherein the image is an MLIR reconstruction.

5. Method of claim 1, wherein the image is a dual-energy image comprising two images, one for each energy channel, wherein the noise level specification includes a separate noise level specification for each energy channel, and wherein the steps of the method are applied separately for each of the two energy channel images.

6. An image processing apparatus configured to effect a model-based image segmentation, comprising:
  a segmenter configured to perform the method according to claim 1, wherein the segmenter comprises:
    an input port configured to receive the image;
    a processor configured to segment the image for a model; and
    an output port configured to output one of the differently adapted models.

7. Method of claim 1, further comprising:
  receiving the initial image, at least part of the image information encoding at least two different plateaus, high and low, that define an edge region between said high and low plateaus;
  for an edge region point carrying an edge region point value and based on the noise specification as applicable to said point, evaluating an uncertainty at said point with respect to a confidence threshold;
  in dependence on said local noise evaluation, generating a high- or low-image from the initial image by either shifting the edge region point's value towards the higher plateau to so obtain the high-image, or by shifting the edge point value towards the lower plateau to so obtain the low-image;
  displaying the high- or low-image instead of or alongside with the image to so furnish information on the uncertainty as to the course of the edge, the uncertainty at least partly caused by the noise.

8. Method of claim 7, comprising:
  toggling between the high- and low-image so as to display, in turn, the high- and low-images.

9. Method of claim 7, comprising:
  cycling through the high-image, low-image, and the image in a user-defined order.

10. Method of claim 7, comprising:
  displaying, a difference image formed from any one of i) the high-image and the image and/or ii) the low-image and the image.

11. Method of claim 7, comprising:
  displaying a mean course for the edge alongside with either one or both of the high- and low-image, the mean course computed from the mean of the probability distribution at the edge points forming the edge.

12. The image processing apparatus of claim 6, further configured to:
  receive i) at input port the initial image, at least part of the image information encoding at least two different plateaus, high and low, that define an edge region between said high and low plateaus, and ii) the specification;
  for an edge region point carrying an edge region point value and based on the noise specification as applicable to said point, evaluate an uncertainty at said point with respect to a confidence threshold;
  in dependence on said local noise evaluation, generate a high- and/or low-image from the initial image by either shifting the edge region point's value towards the higher plateau to so obtain the high-image, or by shifting the edge point value towards the lower plateau to so obtain the low-image;
  output the high- or low-image at output port and to effect displaying the high- or low image on a display unit, instead of or alongside with the image, to so furnish information on the uncertainty as to the course of the edge, the uncertainty at least partly caused by the noise.

13. A non-transitory computer-readable medium storing a computer program element for controlling an image processing apparatus, which, when being executed by a processing unit is adapted to perform the method steps of claim 1.

14. A non-transitory machine-readable medium having stored thereon the program element of claim 13.

* * * * *